US007249670B2

(12) United States Patent
Marian

(10) Patent No.: US 7,249,670 B2
(45) Date of Patent: Jul. 31, 2007

(54) PROCESSING TRANSPORT APPARATUS

(75) Inventor: Liviu L. Marian, Danbury, CT (US)

(73) Assignee: Interlab Incorporated, Danbury, CT (US)

( * ) Notice: Subject to any disclaimer, the term of this patent is extended or adjusted under 35 U.S.C. 154(b) by 189 days.

(21) Appl. No.: 11/063,462

(22) Filed: Feb. 22, 2005

(65) Prior Publication Data

US 2006/0185155 A1 Aug. 24, 2006

(51) Int. Cl.
B65G 47/24 (2006.01)
(52) U.S. Cl. .................... 198/406; 198/407; 198/409
(58) Field of Classification Search ............ 198/345.3, 198/402, 406, 407, 409, 456, 465.1, 681; 414/771, 773
See application file for complete search history.

(56) References Cited

U.S. PATENT DOCUMENTS

| 4,141,193 | A | * | 2/1979 | Joa .............................. 53/529 |
| 4,768,641 | A | * | 9/1988 | Hibi et al. ................... 198/408 |
| 4,874,078 | A | * | 10/1989 | Meyer ......................... 198/409 |
| 5,141,095 | A | * | 8/1992 | Kamp ......................... 198/409 |
| 5,310,300 | A | * | 5/1994 | Crabb et al. ................. 414/280 |
| 5,895,192 | A | * | 4/1999 | Parnell et al. .......... 414/225.01 |
| 6,138,818 | A | * | 10/2000 | Green ......................... 198/373 |
| 6,217,274 | B1 | * | 4/2001 | Svyatsky et al. ........... 414/405 |
| 6,662,927 | B2 | * | 12/2003 | Wellman et al. ............ 198/406 |
| 6,669,004 | B1 | * | 12/2003 | Schoop et al. .............. 198/441 |
| 7,175,017 | B2 | * | 2/2007 | Carey et al. ................ 198/412 |

* cited by examiner

Primary Examiner—Douglas Hess
(74) Attorney, Agent, or Firm—Howard S. Reiter

(57) ABSTRACT

In a conveyor work-piece processing system, transport carriages move along a work path, each carriage carrying a plurality of work-piece articles. In the disclosed embodiment, the path is folded back upon itself forming two parallel paths, one above the other, with transport carriages moved vertically from the lower path to the upper path, so that the entrance to the track and the exit from the track are positioned in close proximity to each other. Each transport carriage has a long dimension and a relatively shorter dimension, and each carriage can be reoriented selectively so that the long dimension or the short dimension can be aligned parallel to the work path. Changing the alignment of the two dimensions relative to the direction of the path permits a work piece to remain for a longer time within a given process stage or area along the work path while achieving a system flow-rate of one carriage-in-one carriage-out.

8 Claims, 4 Drawing Sheets

PROCESSING TRANSPORT APPARATUS

BACKGROUND OF THE INVENTION

1. Field of the Invention

This invention relates generally to manufacturing process systems, and more specifically relates to a processing system in which work transport carriages are reoriented relative to a work path along which they are transported, enabling work-piece articles that are carried on the carriages to dwell for a longer time in one processing stage than in another while maintaining a "one-unit-in, one-unit-out balance" for the system overall. The work path along which the carriers move is folded vertically upon itself so that its beginning and its end are in the same general location. The system of this invention has wide application but has found specific use in the "wet process" operations characteristic of optical lens manufacture.

2. Description of the Related Art

Conveyorized continuous transport systems are known to be ubiquitous in manufacturing and processing industries. The advantage of such systems over other work transfer methods such as "Batch Processing" is that in contrast to the use of several independent and differing multi-stage processing sections, between which workloads are transported by additional robots or by hand, the continuous transport method permits "in-line" movement of workloads through many and varied multi-stage processing operations, thus eliminating the need for human or robotic intervention for moving work-pieces among and between the differing process stages or functions.

However, continuous transport process systems typically require larger floor areas, e.g. more factory-floor "real estate", than most "batch" process systems. In addition, such continuous systems can require even more floor-space when the required process times for individual processing stages within the processing system, are not uniform throughout the system.

SUMMARY OF THE INVENTION

The work-piece transport system of the present invention preserves the advantages of continuous, balanced processing while minimizing the floor space or "real estate" required for transporting work piece articles to and through the related processing stages.

In accordance with this invention, different processing time requirements at different stages of processing are accommodated by changing the orientation of the workload transport carriers, or "carriages", according to the processing stage through which they are passing in a sequence of plural processing stages.

Thus, for example, in a relatively shorter time processing stage, the articles being processed are arranged in horizontal rows substantially side-by-side along and parallel to the work or motion path, whereas in a stage requiring greater processing time, the articles are arrayed one below the other in vertical rows that are substantially perpendicular to the work or motion path. That is, in the disclosed embodiment, the transport carriages themselves are re-positioned from horizontal to vertical orientation reorienting the.

At a given unit rate of feed (i.e. one unit "in" at the input end, one unit "out" at the exit end) for the transport carriage system, reorienting the articles or the transport carriages from "long" to "short" orientation relative to the work path can increase the effective dwell time (i.e. the total period of time that a work piece spends within a given process stage) by the same ratio as the ratio of the long dimension to the short dimension. The changed orientation or "stacking" of the transport carriages and the increase in dwell-time achieved thereby, further reduces the length (smaller footprint) of the conveyor system.

In accordance with the present invention, a further significant reduction in footprint is achieved by folding the conveyor vertically over itself so that the unloading (exit end) position can be located in the same general location as the loading (entrance end) position. This arrangement in effect creates two parallel, vertically spaced-apart work path portions, with the entrance end of one located conveniently near the exit end of the other. This arranged proximity of the entrance and exit ends facilitates loading and unloading of the overall system by a single robot or human operator positioned at a single physical location where both loading and unloading can be accomplished.

DETAILED DESCRIPTION OF THE PREFERRED EMBODIMENT

Figure 1:
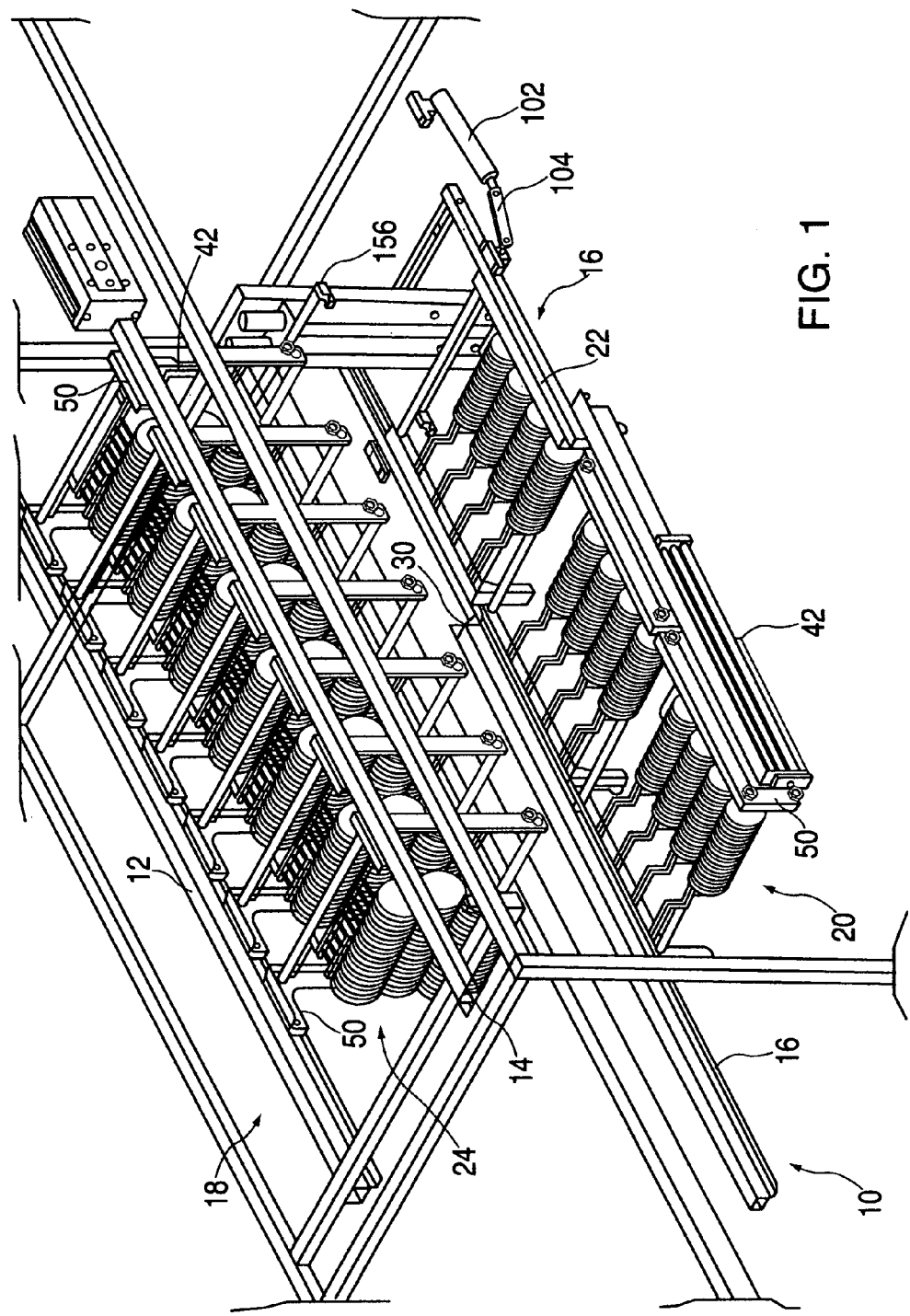
FIG. 1 is an overall partial perspective representation of a work processing transport system in accordance with this invention.

Referring now more particularly to FIG. 1 of the drawings, the disclosed embodiment of a balanced work transport system in accordance this invention may be seen to comprise an elongate article transport guide 10 having a pair of parallel rails 12, 14, with a plurality of work-piece transport carriages 50 movable along the rails from a starting or input point 20 to an ending or exit point 24. Points 20, 24 for the purpose of this invention are generally arbitrary designations and no specific structural features are contemplated at this time for delivering transport carriages into the system or for facilitating their exit from the system. Any obvious and convenient arrangements may be provided, including merely accessible open ends to rails 12, 14, as shown in FIG. 1. It should be understood readily by those having skill in this art, that portions of one or the other of rails 12, 14 are not shown in the drawings, for purposes of clarity of illustration.

In the disclosed embodiment, the guide 10 is shown to comprise a first guide portion 16 and a second guide portion 18 which is positioned above and generally in-line with the lower portion 16. Guide 10 may preferably have the form of a rail or track which may have a conventional rail-road track or I-beam track-like configuration, but it will be evident to those skilled in this art that other and different forms of continuous guide path structures may be used to achieve the guided movement along a specified path in accordance with the invention herein disclosed. Further, it should be understood that first and second guide portions, 16, 18 preferably are disposed as shown, one above the other in accordance with this invention, although in certain circumstances it may be possible to position two guide path portions at the same or substantially the same elevation.

Figure 2:
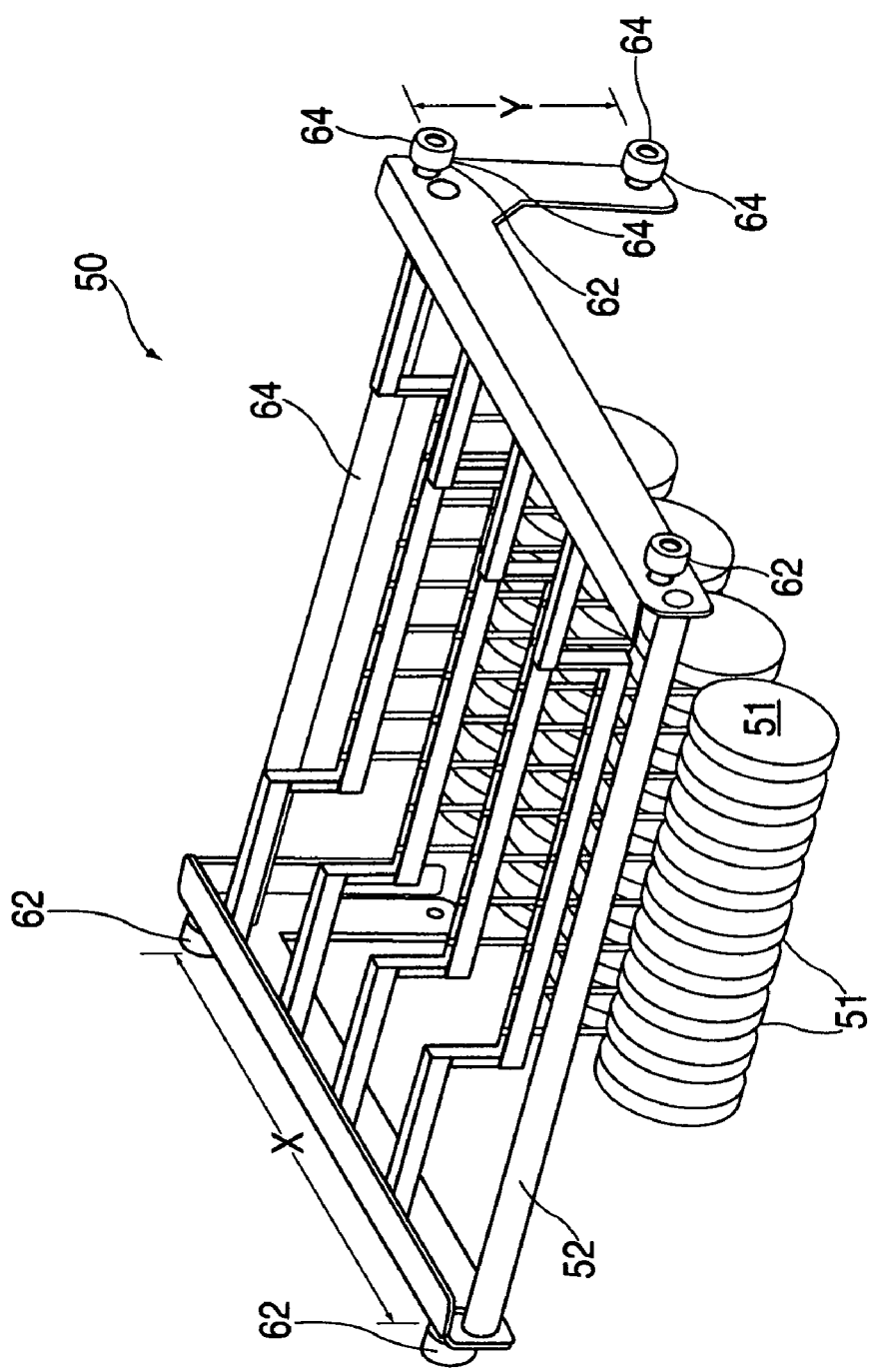
FIG. 2 is a detail pictorial representation of a work-piece transport carriage that is used in the transport system illustrated in FIG. 1.

As shown most clearly in FIG. 2 of the drawings, carriages 50 have first pairs of transport guide-engaging wheels 62 spaced apart along a relatively longer dimension X and second pairs of transport guide-engaging wheels 64 spaced apart along a second dimension Y, that is relatively shorter than dimension X. Each pair of wheels preferably includes at least one wheel common to the other, as shown, although other and different arrangements may be adopted within the spirit and scope of the disclosed invention. To achieve the benefit of the two axes X and Y in accordance with this invention, it is noted the two are positioned, or skewed, at a non-linear angle to each other. Specifically, it is anticipated that X and Y will most often be arranged at a right angle to each other, but it should be understood that other, different angles may be adopted provided only that the two dimensions are arranged in non-linear (e.g. non-parallel) relationship.

In accordance with this invention, carriages 50 may be reoriented selectively relative to guide 10 so that either dimension X or dimension Y is generally parallel to the adjacent portion of the motion path defined by the guide, as shown in FIG. 1. In FIG. 1, dimension X is parallel to the adjacent portion of the guide 10 along lower guide portion 16 with wheels 62 engaged to guide 10, while dimension Y is parallel to the adjacent portion of the guide 10 with wheels 64 engaged to guide 10 along upper guide portion 18.

It can now be seen that when carriages 50 are coupled to guide 10 via wheel pair 62 the carriages occupy a significantly greater space, i.e. length, along guide path 10 than they occupy when coupled to the guide by means of wheel pair 64. This reorientation of the transport carriages 50 to achieve different path length occupancy is an important feature of this invention.

Figure 3:
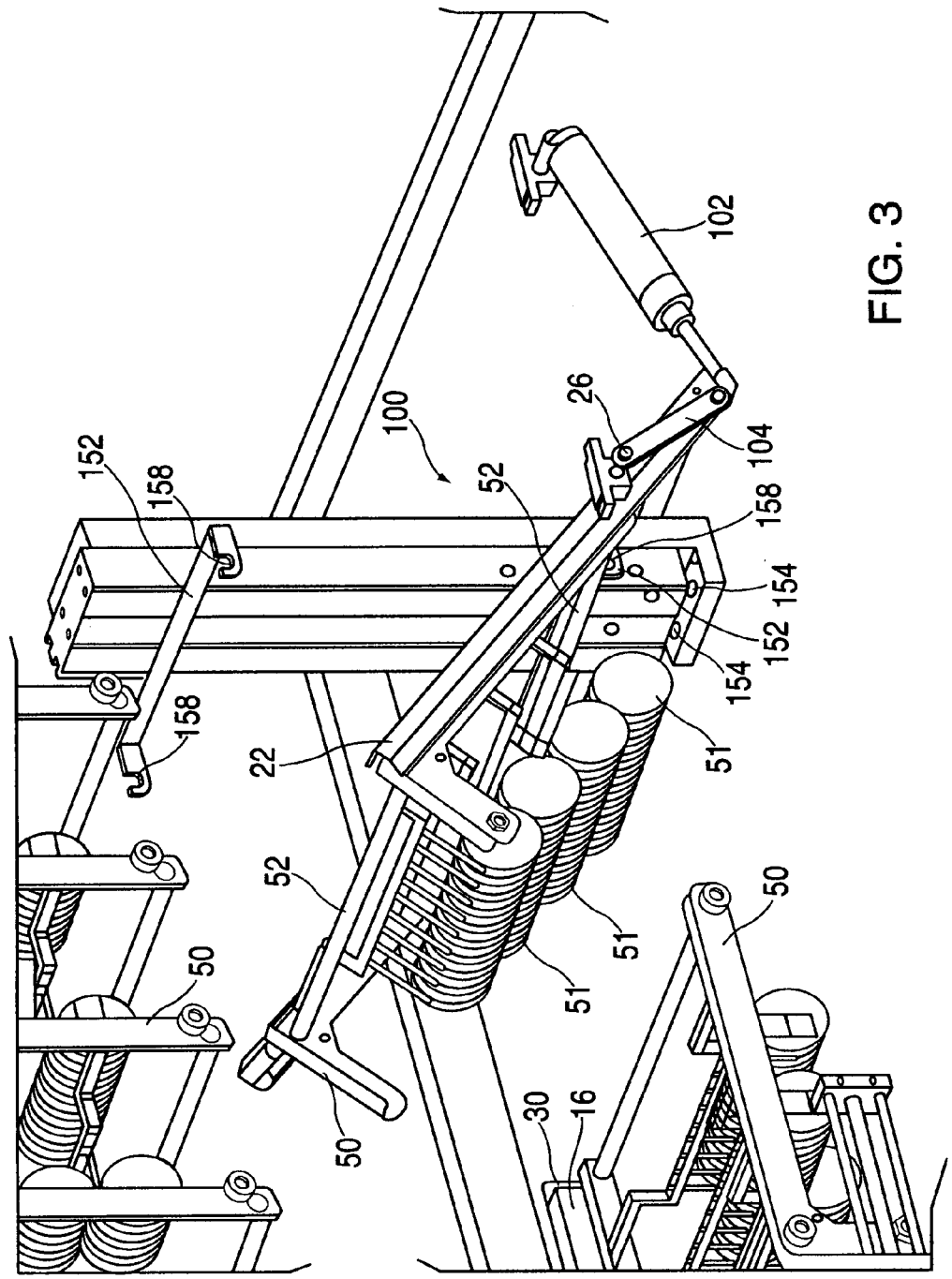
FIG. 3 is a detail pictorial representation of part of the orientation-changing mechanism for work carriages embodied in the transport system illustrated in FIG. 1.

Reorientation of work-piece transport carriages 50 is achieved by means of an orientation-changing apparatus 100, shown most clearly in FIG. 3 of the drawings. As shown in FIG. 3, orientation-changing apparatus 100 comprises a linear displacement piston and cylinder device 102 coupled to a movable section 22 of first portion 16 of transport guide 10. In general, movable section 22 is positioned at the end 30 of first portion 16 of guide 10, preceding the entrance 32, to second guide portion 18, where reorientation of work-piece transport carriages 50 from their first to their second position is desired for the purposes of the invention.

As shown in FIG. 3, movable section 22 of guide portion 16 is pivotally mounted about an axis 26, that allows section 22 to be displaced, by activation of cylinder 102 acting upon a lever arm 104 coupled to section 22. One having skill in the art will recognize that one end of cylinder assembly 102 is fixed to a stationary part of the system structure while the opposite end is coupled to the movable lever that moves guide section 22. Activation of cylinder 102 pivots guide section 22 from substantially horizontal alignment with guide portion 16 to vertical alignment substantially perpendicular to the travel path defined by guide portion 16. Movable section 22 is dimensioned, and aligned initially, to receive the entire length of a transport carriage 50 along the dimension (dimension X) aligned with guide portion 16, so that the length of the carriage along dimension X is reoriented, along with movable section 22, from a substantially horizontal position to a substantially vertical position, when displacement cylinder 102 is activated.

Similarly, successive carriages 50 will be displaced or "reoriented" from a first position with dimension X in parallel alignment with guide portion 16, to a second position in which dimension Y is parallel to guide portion 18 of the guide 10. That is, each carriage is reoriented, successively, from a first position in which the first pair of transport guide-engaging wheels 62 are disposed to travel along the guide 10 to a second position in which the second pair of transport guide-engaging wheels 64 are aligned to engage and travel along the guide 10.

In this disclosed and preferred embodiment of the invention, second work-carriage guide portion 18 is positioned above and substantially parallel to first guide portion 16. In this configuration, first and second portions 16, 18 are substantially equal in length (i.e. each portion comprises substantially one-half of the total length of the work path) so that the entrance 32 to second portion 18 is directly above the reorientation end 30 of first portion 16, and system input point 20 is in close proximity to (i.e. substantially adjacent and below) system exit point 24.

Further, locating entrance 32 directly above end 30, facilitates the transfer of a reoriented carriage 50 from first guide portion 16 to second guide portion 18. That is, it can now be seen in FIG. 4 that, after carriage 50 is reoriented from its first position (with dimension X parallel to guide 16) to its second position (with dimension Y parallel to guide portion 18) the carriage is raised vertically by a vertical transfer mechanism 150 until dimension Y is aligned parallel to the path defined by guide portion 18. At this point, the carriage 50 is advanced linearly in the horizontal direction until the second pair of transport guide-engaging wheels 64 is fully engaged to travel along guide portion 18 and the carriage is set to continue along the processing path on that portion (18) of the transport guide, in the direction of exit point 24.

Figure 4:
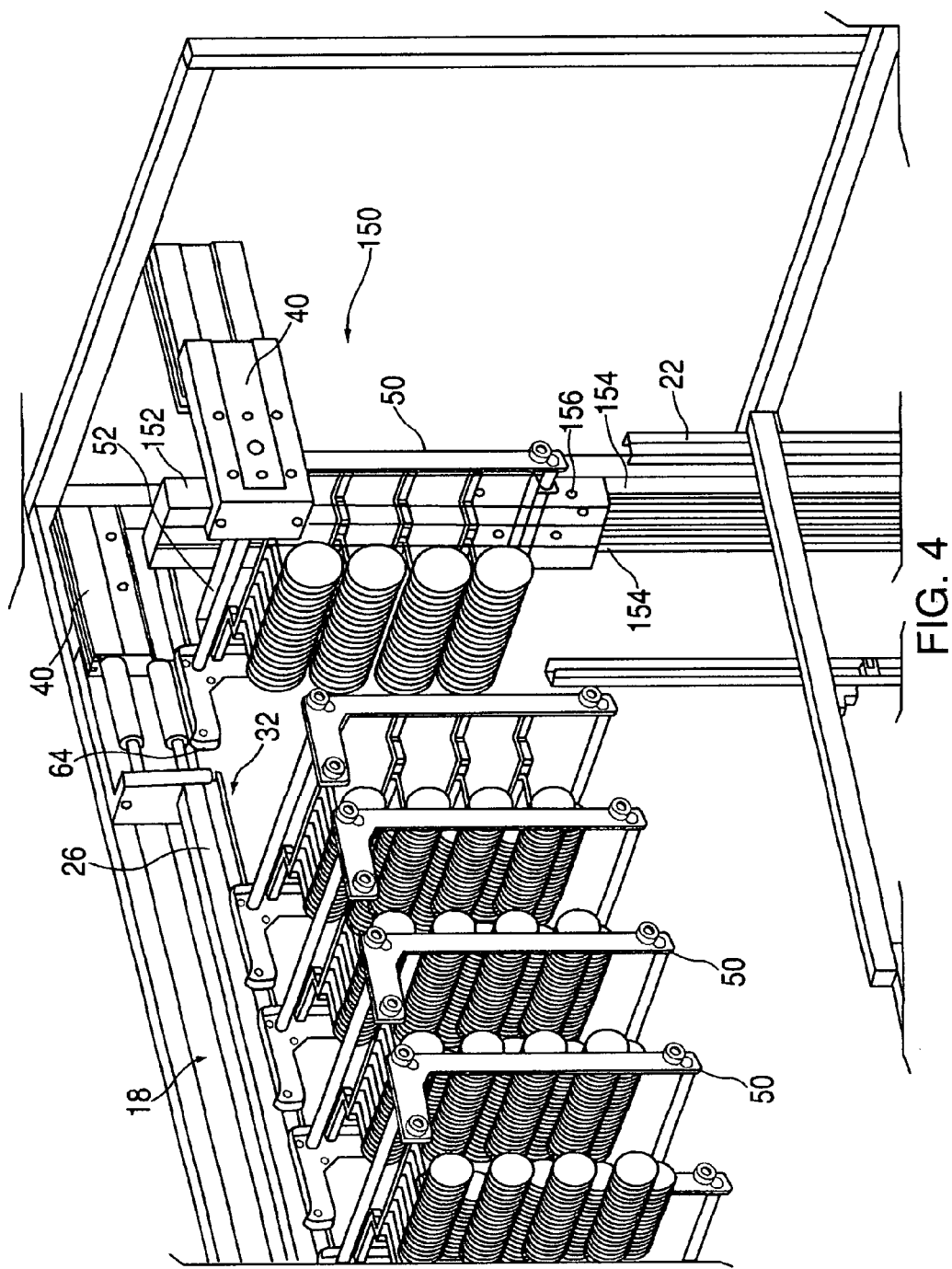
FIG. 4 is a detail pictorial representation of a further part of an orientation-changing mechanism for work carriages embodied in the transport system illustrated in FIG. 1.

Raising carriage 50 vertically from within movable guide section 22 toward guide portion 18 is accomplished simply, as shown in FIG. 4, by means of vertical transport mechanism 150. Informed by the disclosure of the invention herein set forth, the design and operation of the vertical transport mechanism 150 can be seen to comprise simply a housing 152 incorporating one or more cylinders (not seen) that receive corresponding pistons 154. Mounted on the exterior surface of housing 152, one or more notched racks 156 having notches 158 are located in alignment to engage one or more structural struts 52 mounted to carriage 50 as movable guide section 22 is displaced from an initial horizontal position to a second, vertical position as explained above. When struts 52 are engaged with notches 158, carriage 50 is carried along when housing 152 is displaced in the vertical direction. Accordingly, carriage 50 is lifted vertically as pistons 154 are displaced from within the cylinders (not seen) within housing 152, and first wheel pairs 62 travel along and out of now vertically-oriented movable section 22 of transport guide 10 until second wheel pairs 64 are aligned with the guide path defined by second guide portion 18.

To facilitate transition of wheel pairs 64 into engagement with guide portion 18, the disclosed embodiment of the invention incorporates a pair of slidable transition track sections 26 formed at entrance end 32 of guide portion 18 (only one such section is shown in FIG. 4 the other slidable section having been deleted from the drawing for purposes of clarity of illustration) which are coupled to a pair of linearly displaceable piston and cylinder assemblies 40 of the type that have been identified elsewhere herein. Although piston and cylinder assemblies are disclosed in several places herein as a means for achieving linear displacement of relatively movable parts, those skilled in this art will recognize that other and different forms of linear displacement mechanisms may be used for this purpose within the scope of the invention herein disclosed.

With continuing reference to FIG. 4, it will be understood that assemblies 40 are fixed at one end to a stationary portion of the system structure, while the opposite, movable end is coupled to displace slidable track sections 26 into engagement with wheels 64 of carriages 50, after the carriage has been vertically displaced to bring wheels 64 into alignment with the path defined by guide portion 18. When wheels 64 are engaged on rail section 26, the carriage may then be linearly advanced along the rail to continue its transport travel along guide portion 18. Following each such advance, cylinder assemblies 40 are retracted to position slidable sections 26 to allow a next carriage to be advanced vertically into alignment with guide portion 18.

Throughout the description of this invention up to this point, reference has been made to advancing carriages 50 linearly in desired directions along portions of guide 10. Although a specific means for achieving such linear advances has not been described, it will be understood by those skilled in this art, that one or more of various well known mechanisms and devices may be used for this purpose. In FIG. 1 of the drawings, carriage-displacement piston and cylinder assemblies 42 are shown mounted to the sides of and substantially parallel to guide portions 16, 18 in position to engage adjacent portions of carriages 50 by means of any well-known ratchet-like mechanism. Cylinder assemblies 42 are activated to linearly advance the ratchet engaging device in the desired direction of advancement of an adjoining carriage when carriage advance is desired, and the ratchet is then withdrawn in the opposite direction allowing the ratchet to disengage from the carriage into ready position for the next carriage advance. The mechanism of achieving this form of advance of carriages 50 along guide 10 is when known and will be obvious to all those having skill in the art, and accordingly, details of placement and structure of these carriage advance assemblies 42 are not included herein. It is believed to be sufficient to point out that assemblies positioned at input end 20 of first (lower) guide 16, and at entrance end 32 to second (upper) guide portion 18 will serve to engage and displace each newly entering carriage 50 in the desired direction and will serve to push other carriages along ahead of the one or more carriage(s) engaged by each assembly. Similarly, it will be understood that, depending upon the length of each portion of guide 10, and the number and weight of carriages carried on each guide portion, more than one assembly 42 may be needed at intervals along each guide portion. Other and different forms of linear carriage-displacement mechanisms may be used within the scope and spirit of the disclosed invention In summary, the system of this invention operates substantially as follows: Carriages 50 bearing a plurality of work-piece articles 51 such as optical lens blanks, are delivered onto carriage guide 10 at input point 20 using either manual or mechanical (e. g. robotic) delivery means. As each new carriage is delivered into the system, it is engaged and advanced by carriage displacement assemblies 42 toward the opposite end of the corresponding guide portion (e.g. lower guide portion 16 or upper portion 18). Such advances are understood to be periodic depending upon the frequency of delivery and the spacing, if desired, between successive groups of carriages. During intervals between carriage advance, external apparatus independent of this invention may be advanced or otherwise applied to treat and/or manipulate work-pieces 51 carried on the carriage 50. At the end of one portion (e.g. portion 16) of guide 10, orientation-changing apparatus 100 reorients carriage 50 relative to guide 10 from say a long-dimension horizontal alignment relative to the path along guide 10, to a shorter-dimension vertical alignment relative to the guide path. Positioning carriages 50 with a shorter dimension extending along the guide path allows a larger number of carriages to occupy any given length of the guide path and accordingly extends the time that a carriage remains on the path before it must be removed from the system in accordance with the generally desired one-carriage-in-one carriage-out operating standard. For example, if "wet treatments" take place along the relatively faster moving lower path portion of the disclosed system, longer-term drying operations may take place along the relatively slower moving upper portion of the path. Because carriages and their appended work-pieces move at different unit rates of displacement along portions of the work path that are relatively equal in length, (e.g. guide portions 16, 18), the "real estate" occupied by the disclosed system is reduced to a minimum relative to prior art systems. A still further novel feature of the disclosed system is that the disclosed reorientation and corresponding vertical "transition" from a lower path portion to an upper one achieves even greater reduction in needed "real estate" required.

Although a preferred embodiment of the invention has been illustrated and described, it will be obvious to those having skill in this art that various other forms and embodiments of the invention now may be visualized, readily, by those having skill in this art, without departing substantially from the spirit and scope of the invention set forth in the accompanying claims.

What is claimed is:

1. A balanced work transport system for moving articles in transport carriages through different processing stages, and having the capacity for providing for a dwell time in one processing stage different from the dwell time in another processing stage, said system comprising:

an elongate article transport guide for guiding transport carriages, in a substantially linear direction along a given motion path, from a starting point to an ending point, said guide having at least a first portion and a second portion;

a plurality of transport carriages, each carriage bearing a plurality of articles, and each being displaceably coupled for displacement along said transport guide, said transport carriages being characterized by a given X dimension and a given Y dimension, said X and Y dimensions extending at a non-linear angle to each other;

coupling apparatus for displaceably coupling said transport carriages to said article transport guide, so that said transport carriages are reorientable from a first carriage position in which said X dimension is substantially parallel to an adjacent portion of said transport guide, to a second carriage position in which said Y dimension is substantially parallel to an adjacent portion of said transport guide; and orientation-changing apparatus positioned at a predetermined first orientation-changing position along said given motion path, to reorient said transport carriages from one of said first and second carriage positions to the other of said first and second carriage positions;

said X and Y dimensions being significantly different from each other such that said transport carriages when disposed in side-by-side relationship along said transport guide occupy a significantly greater length of said guide when oriented in one of said first and second carriage positions than when oriented in the other of said first and second carriage positions.

2. A balanced work transport system in accordance with claim 1, wherein:
   said first portion of said elongate article transport guide is positioned directly above and substantially parallel to said second portion of said guide; and
   said orientation-changing apparatus further comprises a vertical transfer mechanism for elevating at least one of said transport carriages at a time from engagement with said first portion to engagement with said second portion.

3. A balanced work transport system in accordance with claim 1, wherein:
   said article transport guide comprises a parallel rail structure.

4. A balanced work transport system in accordance with claim 1, further comprising:
   at least one carriage-displacement mechanism associated with each of said first and second guide portions for driving said transport carriages along said motion path from said starting point toward said ending point.

5. A balanced work transport system in accordance with claim 4, wherein:
   said carriage displacement mechanism comprises a piston and cylinder apparatus having a ratchet pawl for engaging said carriages for displacement in one direction only.

6. A balanced work transport system in accordance with claim 1, wherein:
   said coupling apparatus coupling said transport carriages to said guide comprises at least a first pair and a second pair of wheels on each said carriage, the said wheels of each said pair being spaced from each other along said X and Y axes for coupling said carriages to said guide in, respectively, said first and said second carriage positions.

7. A balanced work transport system in accordance with claim 2, wherein:
   said motion path extends over a given total length, said first and said second portions of said guide each comprising substantially half of said total length;
   said orientation changing apparatus is positioned intermediate said first and said second guide portions; and
   said system further comprising a transfer mechanism for transferring said transport carriages from said first guide portion to said second guide portion.

8. A balanced work transport system in accordance with claim 7, wherein:
   said transfer mechanism comprises a rack for engaging said at least one of said carriages disposed in one of said first and second carriage positions, and a linear displacement device for displacing said rack with said engaged carriage into alignment for engagement of said at least one of said carriages with said second guide portion.

* * * * *